US012566963B1

(12) United States Patent
Jampani et al.

(10) Patent No.: US 12,566,963 B1
(45) Date of Patent: Mar. 3, 2026

(54) CONVOLUTIONAL NEURAL NETWORKS WITH CONTENT-ADAPTIVE FILTERS

(71) Applicant: NVIDIA Corporation, Santa Clara, CA (US)

(72) Inventors: Varun Jampani, Westford, MA (US); Hang Su, Hadley, MA (US); Deqing Sun, Providence, RI (US); Orazio Gallo, Santa Cruz, CA (US); Erik G. Learned-Miller, Amherst, MA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 58 days.

(21) Appl. No.: 16/359,782

(22) Filed: Mar. 20, 2019

(51) Int. Cl.
| | |
|---|---|
| *G06N 3/084* | (2023.01) |
| *G06F 18/40* | (2023.01) |
| *G06T 5/70* | (2024.01) |
| *G06T 7/10* | (2017.01) |

(52) U.S. Cl.
CPC ............. *G06N 3/084* (2013.01); *G06F 18/40* (2023.01); *G06T 5/70* (2024.01); *G06T 7/10* (2017.01); *G06T 2207/20024* (2013.01); *G06T 2207/20081* (2013.01); *G06T 2207/20084* (2013.01)

(58) Field of Classification Search
CPC ........... G06N 3/084; G06T 7/10; G06T 5/002; G06T 2207/20024; G06T 2207/20081; G06T 2207/20084; G06K 9/6253
USPC ........................................................ 382/156
See application file for complete search history.

(56) References Cited

U.S. PATENT DOCUMENTS

| | | | | |
|---|---|---|---|---|
| 11,315,016 B2* | 4/2022 | Sundaram | ................ | G06N 7/01 |
| 2007/0130618 A1* | 6/2007 | Chen | ........................ | G06F 21/36 |
| | | | | 726/8 |
| 2007/0277224 A1* | 11/2007 | Osborn | ................... | G06F 21/36 |
| | | | | 726/2 |
| 2010/0043062 A1* | 2/2010 | Alexander | ............ | H04L 9/3226 |
| | | | | 726/6 |
| 2014/0130148 A1* | 5/2014 | Sako | ........................ | G06F 21/36 |
| | | | | 726/19 |
| 2020/0356653 A1* | 11/2020 | Cho | ........................ | G06N 3/084 |

OTHER PUBLICATIONS

Pembelajaran, "Student Notes: Convolutional Neural Networks (CNN) Introduction", IndoML.com 2018 (Year: 2018).*
Hariharan, Simultaneous Detection and Segmentation, ECCV 2014 (Year: 2014).*
Chen "Background Subtraction using Compressed Low-resolution Images" Journal of Latex Class Files 2015 (Year: 2015).*

(Continued)

*Primary Examiner* — Mark Roz
(74) *Attorney, Agent, or Firm* — Davis Wright Tremaine LLP

(57) ABSTRACT

Systems and methods to train a convolutional neural network having two or more filter layers having different filtering parameters corresponding to respective different portions of a digital representation of an image. A processor comprising one or more arithmetic logic units (ALUs) to be configured to identify one or more features within an image based, at least in part, on a convolutional neural network having two or more filter layers having different filtering parameters corresponding to respective different portions of a digital representation of the image.

19 Claims, 10 Drawing Sheets

(56) References Cited

OTHER PUBLICATIONS

Anuse, A novel training algorithm for convolutional neural network, Complex Intell Sys 2016 (Year: 2016).*

Long, Fully Convolutional Networks for Semantic Segmentation, CVPR 2015 (Year: 2015).*

D. H. Rao ,A Survey on Image Enhancement Techniques: Classical Spatial Filter, Neural Network, Cellular Neural Network, and Fuzzy Filter, IEEE 2006 (Year: 2006).*

Nguyen "Generative Adversarial Networks Using Adaptive Convolution", CVPR 2018 (Year: 2018).*

Xian "Resolution Enhancement in Single Depth Map and Aligned Image" IEEE 2016 (Year: 2016).*

Mairal ("Foundations of Deep Learning from a Kernel Point of View", Inria 2018) (Year: 2018).*

CIFAR-10 (Krizhevsky, "The CIFAR-10 dataset", available 2018 and prior (Year: 2018).*

Zhang et al, "Dynamic Scene Deblurring Using Spatially Variant Recurrent Neural Networks" CVPR (Year: 2018).*

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

Bako et al., "Kernel-Predicting Convolutional Networks for Denoising Monte Carlo Renderings," 2017, 14 pages.

Brabandere et al., "Dynamic Filter Networks," May 31, 2016, 14 pages.

Jampani et al., "Learning Sparse High-Dim. Filters: Image Filtering, Dense CRFs and Bilateral Neural Networks," CVPR, 2016, 10 pages.

Jampani et al., "Video Propagation Networks," CVPR, 2017, 11 pages.

Krähenbühl et al., "Efficient Inference in Fully Connected CRFs with Gaussian Edge Potentials," NIPS, 2011, 9 pages.

Li et al., "Deep Joint Image Filtering, " ECCV, 2016, 16 pages.

Li et al., "Joint Image Filtering with Deep Convolutional Networks," IEEE, Dec. 27, 2018, 14 pages.

Saeedan et al., "Detail-Preserving Pooling in Deep Networks," CVPR, 2018, 9 pages.

Teichmann et al., "Convolutional CRFs for Semantic Segmentation," May 15, 2018, 12 pages.

Vaswani et al., "Attention is All You Need," Dec. 6, 2017, 15 pages.

Wang et al., "Non-local Neural Networks," CVPR, 2018, 10 pages.

Wu et al., "Dynamic Filtering with Large Sampling Field for ConvNets," ECCV, 2018, 16 pages.

Zhang et al., "Self-Attention Generative Adversarial Networks," May 21, 2018, 10 pages.

Nguyen et al., "Generative Adversarial Networks Using Adaptive Convolution," CVPR, Jan. 25, 2018, 13 pages.

Xian et al., "Resolution Enhancement in Single Depth Map and Aligned Image," IEEE, 2016, 9 pages.

* cited by examiner

500

Determine An Adapting Features          502

Determine An Adapting Filter          504

Determine Content-Adaptive Neural Network Layer Based On The Features And Filter          506

CONVOLUTIONAL NEURAL NETWORKS WITH CONTENT-ADAPTIVE FILTERS

BACKGROUND

Convolutions are fundamental operations that are utilized extensively in convolutional neural networks (CNNs). Convolution operations are used in various contexts, such as image processing and computer graphics applications, and are a major building block of CNN architectures. Convolutions are desirable to use for their simplicity and highly optimized implementations on certain processor architectures. Convolutions form one of the most prominent ways of propagating and integrating features across image pixels.

However, there are several challenges and shortcoming with standard CNN implementations. In image processing, once a CNN is learned, the same convolutional filter banks are applied to all images and all pixels irrespective of their content, even when image content varies substantially across pixels and images. Accordingly, a single trained CNN is often suboptimal for some or even all image types as well as different pixels or regions within an image. Learning different filters in an attempt to capture both pixel and image variations presents additional challenges, however, as this increase in the number of parameters can lead to a need for more computing resources (e.g., longer training, larger memory footprint) and an extensive amount of labeled data.

DETAILED DESCRIPTION

Techniques described herein are used to implement, in an embodiment, pixel-adaptive convolution (PAC) which combines spatially shared filters with content-dependent filters. In an embodiment, spatially invariant convolution is generalized by multiplying a convolution filter with a spatially variant filter that operates in a learnable feature space. In an embodiment, spatially invariant convolutions are modified by content-dependent kernels to leverage various advantages of spatially invariant filters while adapting the filters according to the image content.

In an embodiment, a spatially invariant convolution is generalized by multiplying the standard convolution with a spatially variant Gaussian filter that operates in a learnable feature space. In an embodiment, this pixel-adaptive convolution—which is spatially variant—is broadly applicable and can be used in various contexts, including but not limited to deep joint image upsampling. In an embodiment, pixel-adaptive convolution offers an effective alternative to fully-connected CRF (Full-CRF), called PAC-CRF, which performs better than Full-CRF while also having better performance for semantic segmentation on standard benchmarks. In an embodiment, pixel-adaptive convolution can be used as a drop-in replacement for convolution layers in pre-trained convolutional neural networks for consistent performance improvements.

Figure 1:
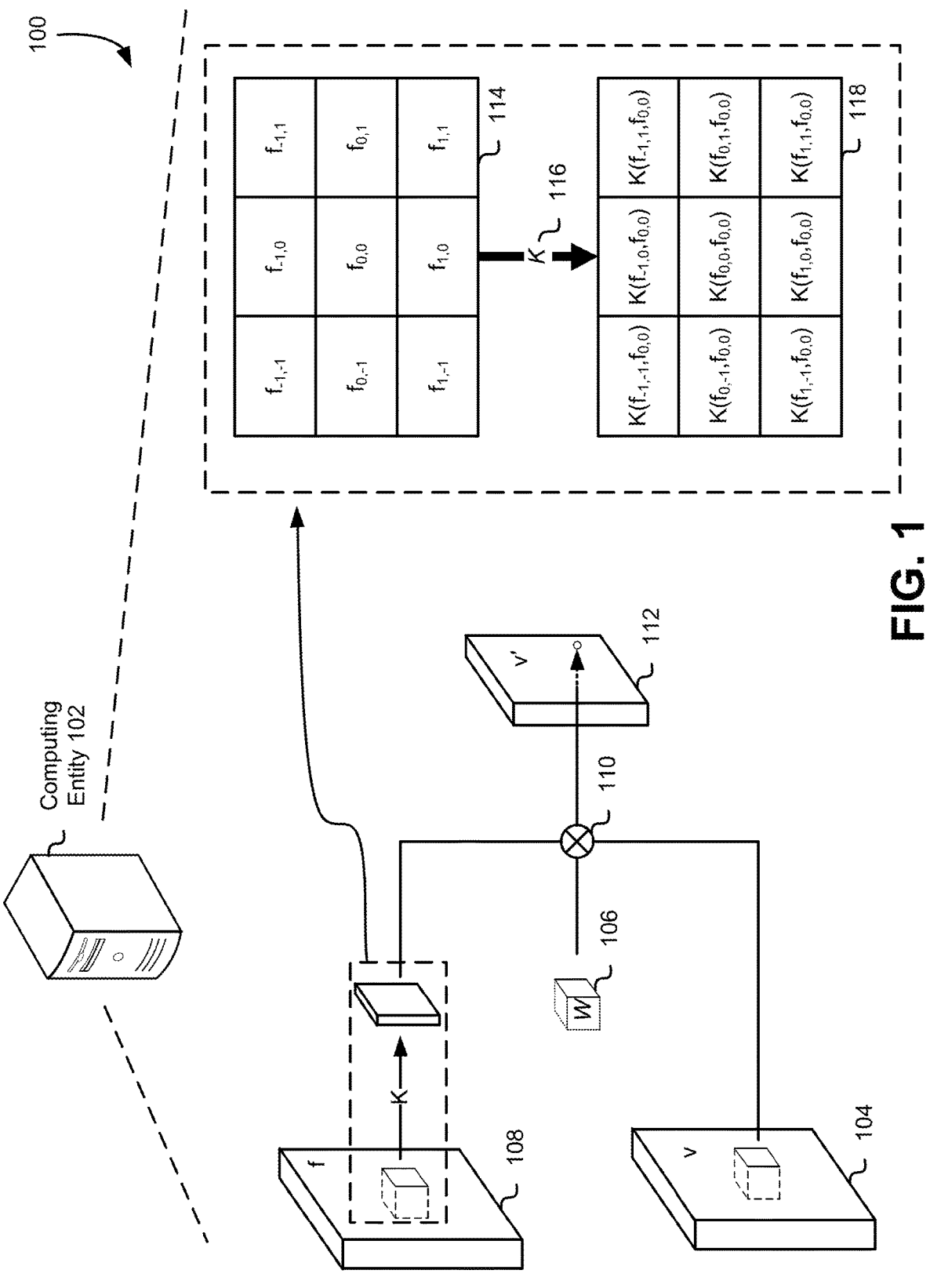
FIG. 1 illustrates a diagram of a system in which an embodiment in accordance with this disclosure is implemented.

FIG. 1 illustrates a diagram of a system 100 in which an embodiment in accordance with this disclosure is implemented. In an embodiment, FIG. 1 illustrates a pixel-adaptive convolution in which the pixel-adaptive convolution modifies a standard convolution on an input 104 by modifying the spatially invariant filter 106 with an adapting kernel 118. In an embodiment, the adapting feature 108 is constructed using either predefined or learned features. In an embodiment, the input 104, spatially invariant filter 106, and adapting kernel 118 are provided to an operation 110 for element-wise product of matrices followed by a summation. In an embodiment, one output channel 112 is illustrated in FIG. 1 for clarity, but more output channels can be implemented according to the techniques described above.

In an embodiment, a spatial convolution of image features $v=(v_1, \ldots, v_n)$ is formally defined as $v'_i = \Sigma_{j \in \Omega(i)} W[p_i - p_j] v_j + b$ wherein $v_i \in \mathbb{R}^c$ over n pixels and c channels with filter weights $W \in \mathbb{R}^{c' \times c \times s \times s}$, $p_i = (x_i, y_i)^T$ are pixel coordinates, $\Omega(\bullet)$ defines a s×s convolution window, and $b \in \mathbb{R}^{c'}$ denotes biases. In an embodiment, the notation [•] denotes indexing of the spatial dimension of an array with 2D spatial offsets. In an embodiment, the convolution operation described above results in a c'-channel output, $v'_i \in \mathbb{R}^{c'}$ at each pixel i. In an embodiment, the weights W depend on pixel position and not on image content, thereby being content-agnostic. In an embodiment, the weights W are spatially shared and image agnostic.

In an embodiment, a content-adaptive convolution operation is dependent on not only pixel location but also image content and the weights W as described above are generalized to depend on pixel features $f \in \mathbb{R}^d$ in the following manner: $v'_i = \Sigma_{j \in \Omega(i)} W[f_i - f_j] v_j + b$ where W can be seen as a high-dimensional filter operating in a d-dimensional feature space. In an embodiment, the equation is applied by projecting the input signal v into a d-dimensional space and performing a d-dimensional convolution with W. In an embodiment, such high-dimensional filtering comprises hand-specified filters such as Gaussian filters. In an embodiment, embodiments of the present disclosure provide advantages over other techniques to freely parameterize and learn the weights W in high-dimensional space which have several shortcomings, including but not limited to needing special lattice structures and hash-tables to perform the convolution, thereby resulting in higher computational overhead; difficulties to learn features f resulting in the use of hand-specified feature spaces such as position and color features; restrictions to the dimensionality d of features as the projected input image can become too sparse in high-dimensional filtering; and more.

In an embodiment, instead of bringing convolution to higher dimensions—which may have one or more drawbacks as described above—a system modifies a spatially invariant convolution with a predefined kernel $K \in \mathbb{R}^{c' \times c \times s \times s}$ that depends on pixel features f, defining the equation for a pixel-adaptive convolution (PAC): $v'_i = \sum_{j \in \Omega(i)} K(f_i - f_j) W [p_i - p_j] v_j + b$ where K is a kernel function with a fixed parametric form such as a Gaussian.

$$K(f_i - f_j) = \exp\left(-\frac{1}{2}(f_i - f_j)^T (f_i - f_j)\right).$$

In an embodiment, as K has a pre-defined form and is not parameterized as a high-dimensional filter, the filter can be performed on the 2D grid itself without moving onto higher dimensions. In an embodiment, pixel-adaptive convolution adapts standard spatial convolution using pixel features f 108 via kernel K 116. In an embodiment, pixel features f may be referred to as "adapting features" and kernel K as "adapting kernel." In an embodiment, the adapting features f are specified by a user (e.g., through experimentation or a prior knowledge). In an embodiment, the adapting features are deep features that are learned end-to-end. In an embodiment, an adapting feature includes but is not limited to position and color features f=(x,y,r,g,b).

In an embodiment, pixel-adaptive convolution generalizes one or more of the following filters: spatial convolution; bilateral filtering; and pooling. In an embodiment, spatial convolution is a specialized case of PAC with adapting kernel being a constant such as defining $K(f_i - f_j) = 1$. In an embodiment, this is achieved by defining a constant adapting feature $f_i = f_j$, $\forall i$, $j \in n$. In an embodiment, standard convolutions differ from pixel-adaptive convolution in many aspects, a difference being that standard convolutions use fixed, spatially shared filters, while PAC allows filters to be modified by the adapting kernel K differently across pixel locations. In an embodiment, bilateral filtering is a specific case of PAC where W has a fixed parametric form, such as a 2D Gaussian filter $$W[p_i - p_j] = \exp\left(-\frac{1}{2}(p_i - p_j)^T (p_i - p_j)\right).$$

In an embodiment, pooling operations are modeled by PAC wherein a standard pooling corresponds to a special case of PAC where $$K(f_i, f_j) = 1, \quad W = \frac{1}{F^2}.$$

In an embodiment, PAC models detail-preserving pooling operation by incorporating an adapting kernel that emphasizes more distinct pixels in a neighborhood, e.g., $K(f_i, f_j) = \alpha + (|f_i - f_j|^2 + \epsilon^2)^\lambda$.

In an embodiment, unlike general filters, a PAC as described herein allows efficient learning and re-use of spatially invariant filters because it is a direct modification of standard convolution filters. In an embodiment, PAC offers a desirable trade-off between standard convolution and dynamic filter networks (DFNs). In an embodiment, in DFNs, filters are solely generated by an auxiliary network and different auxiliary networks or layers are required to predict kernels for different dynamic filter layers. In an embodiment and in contrast, PAC uses learned pixel embeddings f as adapting features, which can be re-used across several different PAC layers in a network. In an embodiment, when related to sparse high-dimensional filter, PAC can be seen as factoring the high-dimensional filter into a product of standard spatial filter W and the adapting kernel K. In an embodiment, this allows for efficient implementation of PAC in 2D space thereby alleviating the need for hash-tables and different lattice structures in higher dimensions. In an embodiment, PAC uses learned pixel embeddings f in contrast to existing learnable high-dimensional filters that use hand-specified embeddings.

In an embodiment, a pixel-adaptive convolution is implemented as a network layer with GPU acceleration. In an embodiment, an implementation of a pixel-adaptive convolution enables back-propagation through the features f, permitting the use of learnable deep features as adapting features. In an embodiment, the pixel-adaptive convolution is implemented as a pixel adaptive transposed convolution (also referred to as a "deconvolution") denoted as $PAC^T$, which is a transposed counterpart of a PAC. In an embodiment, $PAC^T$, similar to standard transposed convolution, uses fractional striding and results in an upsampled input. In an embodiment, PAC and $PAC^T$ allow for flexible specification of different parameters that are commonly used in standard convolution, including but not necessarily limited to: filter size; number of input and output channels; striding; padding; and dilation factor.

Figure 2:
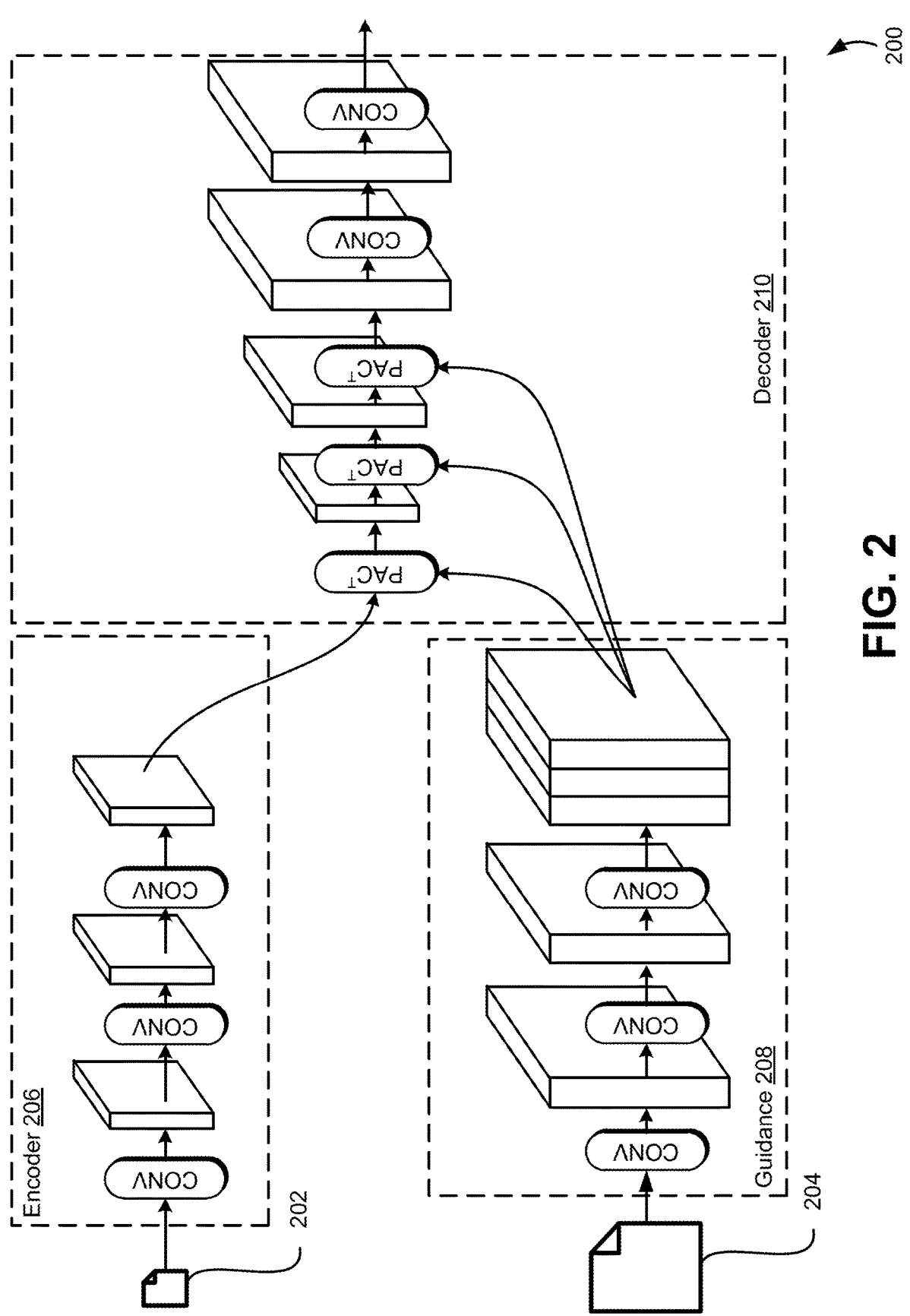
FIG. 2 illustrates a diagram of a system network architecture for joint upsampling with pixel-adaptive convolution, in accordance with one embodiment.

FIG. 2 illustrates a diagram of a system 200 for joint upsampling with pixel-adaptive convolution, in accordance with one embodiment where joint upsampling refers to a task of upsampling a low-resolution signal with the aid of a high-resolution guidance image. In an embodiment, an upsampling task is upsampling a low-resolution signal such as depth and optical flow given a corresponding high-resolution RGB image as guidance. Joint upsampling is useful when some sensors output at lower resolutions than cameras, or can be used to speed-up computer vision applications where full resolution or higher resolution results are expensive to produce. In an embodiment, pixel-adaptive convolution allows filtering operations to be guided by the adapting features, which can be obtained from a separate guidance image. In an embodiment, joint upsampling with $PAC^T$ is implemented according to the architecture illustrated in FIG. 2. Applications for joint upsampling include and are not necessarily limited to: joint depth upsampling; and joint optical flow upsampling.

In an embodiment, a deep joint upsampling network includes two or more inputs comprising an input signal 202 and a guidance signal 204 and outputs at least a high-resolution output signal. In an embodiment, the inputs include a low-resolution signal $$x \in \mathbb{R}^{c \times \frac{h}{s} \times \frac{w}{s}}$$

and a high-resolution guidance $g \in \mathbb{R}^{c_g \times h \times w}$ which are used to generate an upsampled signal $x_\uparrow \in \mathbb{R}^{c \times h \times w}$ where s refers to an upsampling factor. In an embodiment, the upsampling network comprises three components: an encoder branch 206; a guidance branch 208; and a decoder branch 210. In an embodiment, the encoder branch operates directly on the low-resolution signal with standard convolution layers; the guidance branch operates on (e.g., operates solely on) the guidance image and generates adapting features that are to be used in some or all PAC layers in the network; and the decoder branch starts with a sequence $PAC^T$ layers, which does transposed pixel-adaptive convolution, each of which upsamples the feature maps by a factor of two. In an embodiment, $PAC^T$ layers are followed by convolution layers to generate an upsampled output; and exactly two CONV layers follow $PAC^T$ layers to generate a final upsampled output. In an embodiment, all intermediate (e.g., all but the final one) CONV and $PAC^T$ layers are followed by a rectified linear unit (ReLU).

In an embodiment, joint depth upsampling involves a task to upsample a low-resolution depth by using a high-resolution RGB image as guidance. In an embodiment, the low-resolution depth images are obtained from ground truth data (e.g., training image data) using nearest-neighbor downsampling. In an embodiment, the Adam optimizer is used to train a network using a learning rate schedule. In an embodiment, the learning rate schedule is [$10^{-4}$×3.5k, $10^{-5}$×1.5k, $10^{6}$×0.5k]. In an embodiment, mini-batches (e.g., with 256×256 crops) are used during training. In an embodiment, this training setup results in improved performance wherein we use guidance features to adapt $PAC^T$ kernels.

In an embodiment, joint upsampling networks are evaluated to upsample low-resolution optical flow field by using an original image or source image as guidance. In an embodiment, predicting optical flow is a challenging task and even state-of-the-art approaches resort to simple bilinear upsampling to predict optical flow fields for higher resolutions (e.g., original or full resolution). In an embodiment, optical flow is smoothly varying within motion boundaries, which accompanying RGB images and can offer clues about making joint upsampling an appealing solution. In an embodiment, an architecture in accordance with the network architecture referred to in connection with depth upsampling is used or adapted with two channel input and output flow with flow components along horizontal and vertical directions. In an embodiment, a training protocol and low-resolution optical flow is obtained from bilinear downsampling of the ground-truth. In an embodiment, the network described herein is capable of restoring fine-structured details and produce smoother predictions in regions of an image with uniform motion.

Figure 3:
FIG. 3 illustrates a diagram of system for conditional random fields (CRF) with pixel-adaptive convolution, in accordance with one embodiment.
Figure 3:
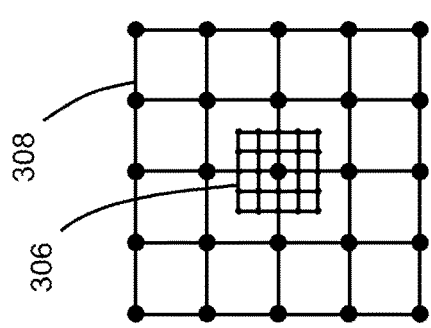
Figure 3:
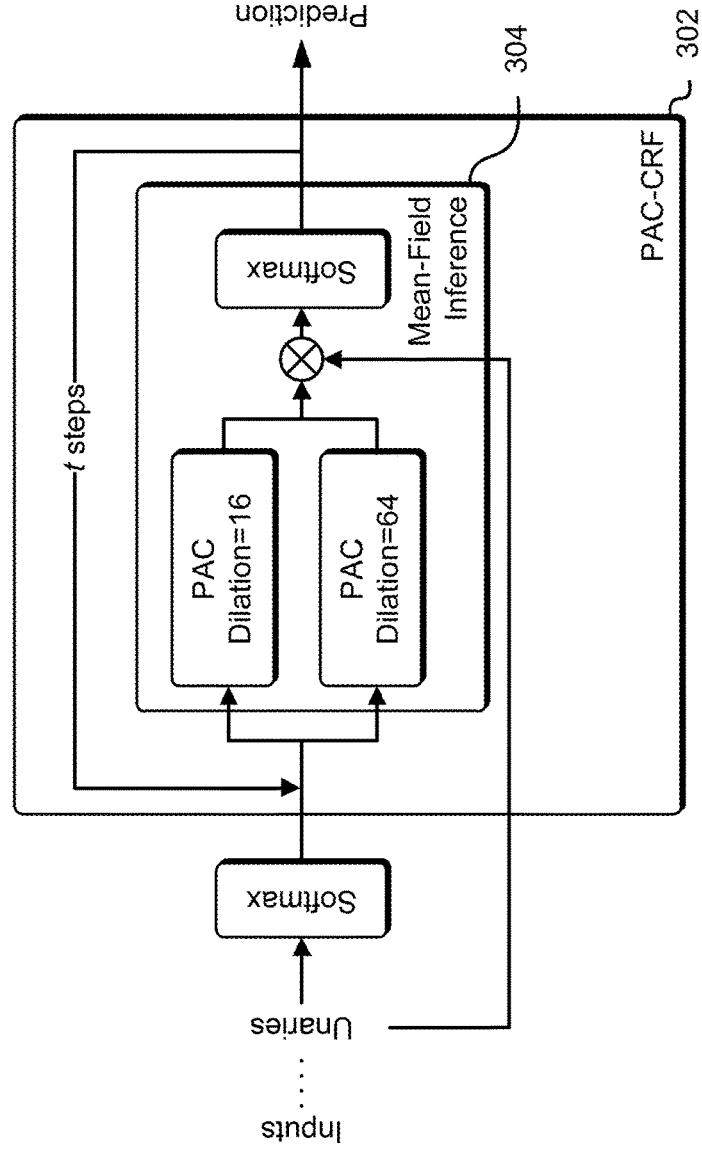

FIG. 3 illustrates a diagram of system 300 for conditional random fields (CRF) with pixel-adaptive convolution—or PAC-CRF—in accordance with one embodiment. In an embodiment, a computing entity or system such as those described in connection with FIGS. 1 and 6-10 implements techniques for PAC-CRF inference. A conditional random field (CRF) may refer to a type of statistical modeling method known to one of ordinary skill in the art.

In an embodiment, a fully connected conditional random field (Full-CRF) resorts to appropriate high-dimensional filtering for efficient inference to offer the benefits of dense pairwise connections among pixels. In an embodiment, for a semantic labelling problem wherein each pixel i in an image I can take on one of the semantic labels $l_i \in \{1, \ldots, \mathcal{L}\}$, the Full-CRF can have unary potentials defined by a classifier such as CNN: $\psi_u(l_i) \in \mathbb{R}^{\mathcal{L}}$ and the pairwise potentials defined for every pair of pixel locations (i, j): $\psi_p(l_i, l_j|I) = \mu(l_i, l_j)K(f_i, f_j)$, where K is a kernel function and $\mu$ is a compatibility function. In an embodiment, the compatibility function is the Potts model: $\mu(l_i, l_j) = [l_i \neq l_j]$, utilizing two Gaussian kernels with hand-crafted (e.g., user-selected) features as the kernel function:

$$K(f_i, f_j) = w_1 \exp\left\{-\frac{\|p_i - p_j\|^2}{2\theta_\alpha^2} - \frac{\|I_i - I_j\|^2}{2\theta_\beta^2}\right\} + w_2 \exp\left\{-\frac{\|p_i - p_j\|^2}{2\theta_\gamma^2}\right\}$$

6 wherein $w_1$, $w_2$, $\theta_\alpha$, $\theta_\beta$, $\theta_\gamma$ are model parameters, and can be found by grid-search. In an embodiment, the inference in Full-CRF amounts to maximizing the following Gibbs distribution: $P(1|I) = \exp(-\Sigma_i \psi_u(l_i) - \Sigma_{i<j} \psi_p \ (l_i, \ l_j))$; $1 = (l_1, l_2, \ldots, l_n)$. In an embodiment, exact inference of Full-CRF is hard and relies on mean field approximation which is optimizing for an approximate distribution $Q(l) = \Pi_i Q_i(l_i)$ by minimizing the KL-divergence between $P(l|I)$ and mean field approximation $Q(l)$. In an embodiment, this leads to the following mean-field (MF) inference step that updates marginal distributions $Q_i$ iteratively for $$t = 0, 1, \ldots : Q_i^{t+1}(l) \leftarrow \frac{1}{Z_i} \exp\left\{-\psi_u(l) - \sum_{l' \in \mathcal{L}} \mu(l, l') \sum_{j \neq i} K(f_i, f_j) Q_j^t(l')\right\}.$$

In an embodiment, the main computation in each MF iteration, $$\sum_{j \neq i} K(f_i, f_j) Q_j',$$

is viewed as a high-dimensional Gaussian filter.

In an embodiment, efficient, learnable CRF with PAC—also referred to as PAC-CRF 302—improves the operation of a computer system by addressing shortcomings of Full-CRF models which are difficult to optimize on various types of processing units such as graphics processing units (GPUs) because it does not follow the single instruction multiple data (SIMD) paradigm for efficient GPU use. Furthermore, reliance on permutohedral lattice convolution results in approximation error being incurred during inference and gradient computation, in an embodiment. PAC-CRF, in an embodiment, improves the efficiency of Full-CRF and other CRF-based techniques and is applicable to and to be integrated into CNN backbones. In an embodiment, PAC-CRF improves learning capacity and achieves better performance compared to Full-CRF implementations.

In an embodiment, in PAC-CRF, pairwise connections over a fixed window $\Omega^k$ are defined around each pixel instead of dense connections such as $$\sum_k \sum_i \sum_{j \in \Omega^k(i)} \psi_p^k(l_i, l_j \mid I)$$

where the k-th pairwise potential is defined as:

$$\psi_p^k(l_i, l_j \mid I) = K^k(f_i, f_j) W_{l_j l_i}^k[p_j - p_i]$$

In an embodiment, $\Omega^k$ (•) specifies the pairwise connection pattern of the k-th pairwise potential originated from each pixel, and $K^k$ is a fixed Gaussian kernel. In an embodiment, this formulation allows the label compatibility $\mu$ in Full-CRF to be modeled by W, and vary across different spatial offsets. In an embodiment, similar derivation as in Full-CRF yields the following iterative MF update:

$$Q_i^{(t+1)}(l) \leftarrow$$

$$\frac{1}{Z_i} \exp\left\{-\psi_u(l) - \sum_k \underbrace{\sum_{l' \in \mathcal{L}} \sum_{j \in \Omega(j)^k} K^k(f_i, f_j) W_{l'l}^k[p_j - p_i] Q_j^{(t)}(l')}_{PAC}\right\}.$$

In an embodiment, MF updates include PAC instead of sparse high-dimensional filtering as in Full-CRF. In an embodiment, PAC-CRF is freely parameterized and pairwise potentials are learned and also use richer forms of compatibility transform W. In an embodiment, PAC-CRF makes use of learnable features f for pairwise potentials instead of pre-defines ones in Full-CRF. In an embodiment, different steps in each MF step 304 with two pairwise PAC kernels are illustrated in FIG. 3.

In an embodiment, pairwise connections in PAC-CRF are defined by the local convolution window $\Omega^k$, in contrast to Full-CRF where a major source of heavy computation is the dense pairwise pixel connections. In an embodiment, a dilation filter is used to have long-range pairwise connections while maintaining the same number of PAC parameters. In an embodiment, multiple PACs with different dilations can be combined together. In an embodiment, a relatively smaller kernel size with a relatively larger dilation can achieve a longer-range pairwise connectivity (e.g., kernel size of 5×5, dilation of 64, and range of 257×257). In an embodiment, use of long-range connections can provide valuable information and this CRF formulation uses a wider range of connections while still being efficient. In an embodiment, the formulation allows the use of multiple PAC filters in parallel, wherein each can have different dilation factors. FIG. 3 illustrates, in an embodiment, coverage of two 5×5 PAC filters with dilations 16 and 64 (illustrated as numerals 306 and 308 of FIG. 3), respectively. In an embodiment, this allows PAC-CRF to achieve a good balance between computational efficiency and a long-range pairwise connectivity.

In an embodiment, semantic segmentation refers to the assignment of a semantic label to pixels of an image. In an embodiment, a semantic label refers to a label or identifier that indicates an underlying meaning of the associated data. In an embodiment, PAC-CRF is used on top of FCN semantic segmentation network or any other suitable CNN, including but not necessarily limited to those that use standard convolution layers. In an embodiment, the RGB color of a pixel is scaled as $$\left[\frac{R}{\sigma^R}, \frac{G}{\sigma^G}, \frac{B}{\sigma^B}\right]^T$$

and used as guiding features for the PAC layers in PAC-CRF. In an embodiment, the scaling vector $[\sigma_R, \sigma_G, \sigma_B]^T$ is learned jointly with the PAC weights W. In an embodiment, PAC-CRF can be calibrated with different internal configurations, such as a first configuration with a single 5×5 PAC kernel with dilation of 32; and two parallel 5×5 PAC kernels with dilations of 16 and 64. In an embodiment, the backbone FCN network is frozen and the PAC-CRF part is trained first for a first set of epochs, and then the whole network is trained for a second set of epochs. In an embodiment, the backbone FCN network is frozen and only the PAC-CRF part is trained for 40 epochs, and then the whole network is trained for another 40 epochs.

In an embodiment, PAC-CRF improves one or more aspects of the operation of a computer system (e.g., processor) including but not necessarily limited to faster performance; and more accurate predictions. In an embodiment, faster prediction refers to a faster runtime for generating predictions. In an embodiment, faster predictions refers to a faster runtime to generate a prediction of a specific or threshold accuracy, which can be measured using intersection over union (IoU) based scoring systems. In an embodiment, more accurate predictions refer to the IoU or mean IoU (mIoU) scores generated by PAC-CRF compared to other techniques such as Full-CRF.

In an embodiment, semantic segmentation with PAC-CRF performs better than Full-CRF while being faster. In an embodiment, PAC-CRF outperforms Conv-CRF. In an embodiment the runtime and performance of various methods is or can be approximated by the following chart:

| Method | mIoU (val/test) | Runtime |
|---|---|---|
| FCN only | 65.51/67.20 | 39 ms |
| Full-CRF | +2.11/+2.45 | +629 ms |
| Conv-CRF | +2.13/+1.57 | +38 ms |
| PAC-CRF, 32 | +3.01/+2.21 | +39 ms |
| PAC-CRF, 16-64 | +3.39/+2.62 | +78 ms |

In an embodiment, the table reports validation and test mIoU scores along with the average runtime of various techniques. In an embodiment, the two-filter variant—indicated as PAC-CRF, 16-64 in the table—achieves better mIoU compared to both Full-CRF and conv-CRF, and also compares favorably in terms of runtime. In an embodiment, the one-filter variant—referred to as PAC-CRF, 32—performs slightly worse than Full-CRF on test, but has a significant speed advantage, providing a strong advantage where efficiency is needed. In an embodiment, it is noted that Full-CRF uses two pairwise kernel. In an embodiment, mIoU changes with different MF steps with a tradeoff between speed and accuracy that is configurable. In an embodiment, 5 MF iterations is selected and is according to the following table that maps validation mIoU to the number of MF steps in PAC-CRF:

| Mean-field (MF) steps | 1 | 3 | 5 | 7 |
|---|---|---|---|---|
| mIoU | 68.38 | 68.72 | 68.90 | 68.90 |

Figure 4:
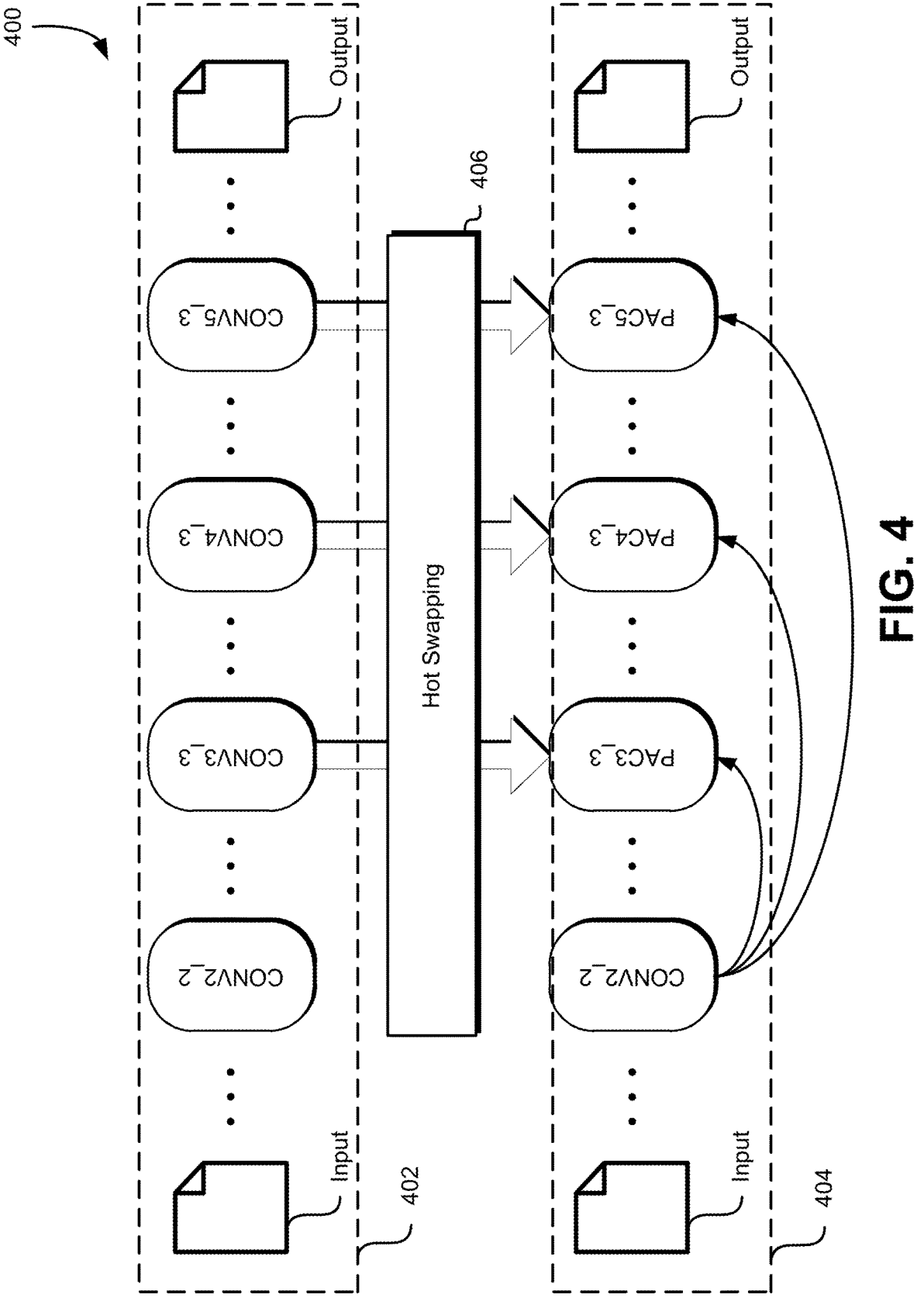
FIG. 4 illustrates a diagram of system for hot-swapping convolutions with pixel-adaptive convolutions for convolutional neural network architecture, in accordance with one embodiment.

In an embodiment, FIG. 4 illustrates a diagram of a system 400 in which a neural network architecture is adapted with a hot swapping modification to utilize pixel-adaptive convolution. In an embodiment, the diagram illustrates a fully convolutional network (FCN) before 402 and after 404 a hot-swapping modification 406. In an embodiment, the system is implemented in accordance with techniques described in connection with FIGS. 1-3. In an embodiment, a computing entity or system such as those described in connection with FIGS. 1 and 6-10 implements techniques for PAC-CRF inference. In an embodiment, a standard CNN is adapted to support pixel-adaptive convolution through layer hot-swapping. In an embodiment, layer hot-swapping refers to directly replacing CONV layers in a network with PAC while retaining the pre-trained weights. In an embodiment, the hot-swapping refers to the modification of a pre-trained network with PAC. In contrast, in an embodiment and in fine-tuning, newly added layers are initialized randomly. In an embodiment, layer hot-swapping is a simple and effective modification to CNNs usable in various applications and domain spaces including but not necessarily limited to semantic segmentation.

In an embodiment, the last CONV layer of the last three convolution groups—CONV3_3, CONV4_3, and CONV5_3—are swapped out for corresponding PAC layers. In an embodiment, FIG. 4 demonstrates that one could use earlier layer features (e.g., CONV2_2, as illustrated in FIG.

4) as adapting features for PAC. In an embodiment, using this strategy, the network parameters do not increase when replacing CONV layers with PAC layers. In an embodiment, some or all the layer weights are initialized as in the original network. In an embodiment, to ensure a better starting condition during training, the guiding features are scaled with a small constant (e.g., 0.0001) so that the PAC layers behave closely to their corresponding CONV counterparts.

In an embodiment, the results of a hot-swapping modification PAC-FCN is or can be approximated by the following table:

| Method | PAC-CRF? | mIoU (val/test) | Runtime |
|--------|----------|-----------------|---------|
| FCN-8s | No | 65.51/67.20 | 39 ms |
| FCN-8s | 16-64 | 68.90/69.82 | 117 ms |
| PAC-FCN | No | 57.44/69.18 | 41 ms |
| PAC-FCN | 16-64 | 69.87/71.34 | 118 ms |

In an embodiment, as noted in the table, PAC-FCN provides approximately 2 mIoU improvement on the test (67.20 vs. 69.18) for the semantic segmentation task performed while incurring virtually no runtime penalty at inference time. In an embodiment, PAC-FCN has the same number of parameters as the original FCN model. In an embodiment, the improvements of PAC-FCN are complementary to CRF post-processing that can still be applied. In an embodiment, combining PAC-CRF (64-16 variant) and trained jointly, another ~2 mIoU improvement is observed in the table.

Figure 5:
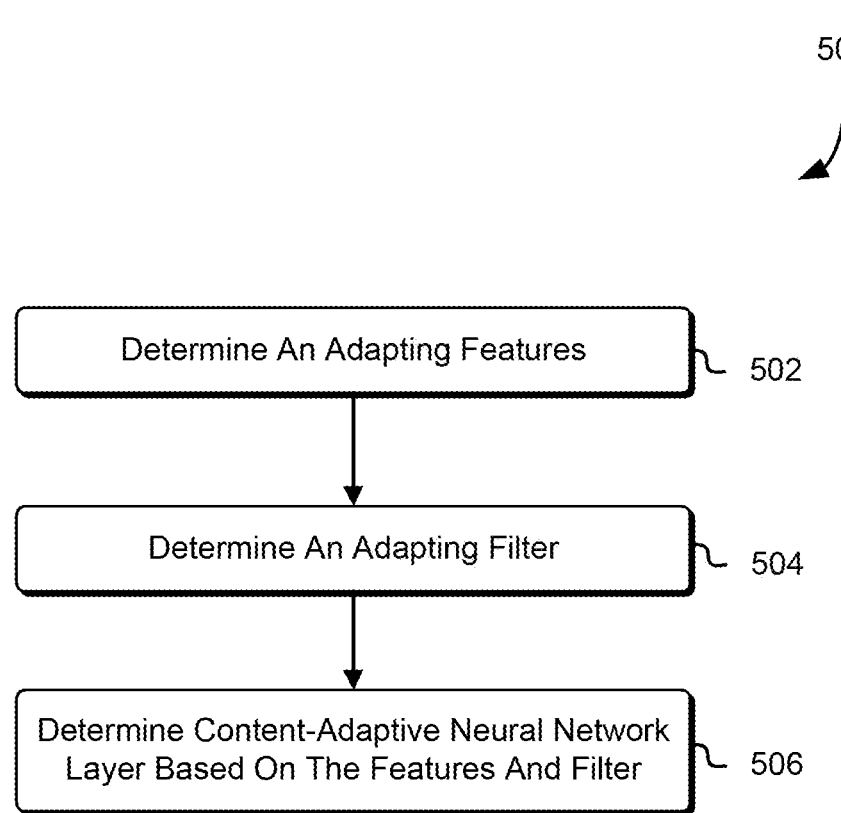
FIG. 5 shows an illustrative example of a process for pixel-adaptive convolution, in accordance with an embodiment.

FIG. 5 shows an illustrative example of a process 500 for pixel-adaptive convolution, in accordance with an embodiment. Some or all of the process 500 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 500 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. In an embodiment, the system performing the process 500 is or includes a processor such as those described in connection with FIGS. 6-10. In an embodiment, the system performing the process 500 is or includes one or more arithmetic logic units (ALUs) having electrical circuitry and being part of central processing units, graphics processing units, and other types of processors described in this disclosure, such as those discussed in connection with FIGS. 6-10. In an embodiment, the system is a computing entity, wherein the computing entity is or includes ALUs and/or processors. The process 500, in an embodiment, is implemented in accordance with techniques described in connection with FIGS. 1-4.

In an embodiment, the system performing the process of FIG. 5 is configured to determine 502 an adapting feature f. In an embodiment, the adapting features are hand-selected by a user and include pixel coordinates and/or color values (e.g., RGB color values, BW scale values). In an embodiment, the adapting features are in accordance with those described in connection with FIG. 1. In an embodiment, the adapting features are deep features which are learned end-to-end. In an embodiment, the system is configured to determine 504 an adapting filter or an adapting kernel. In an embodiment, the adapting kernel K is a kernel function that has a fixed parametric form such as a Gaussian. In an embodiment, the adapting kernel has a pre-defined form and is not parameterized as a high-dimensional filter. In an embodiment, the standard spatial convolution W is adapted at each pixel using pixel features f via kernel K. In an embodiment, the adapting filter or adapting kernel is in accordance with those described in connection with FIG. 1.

In an embodiment, the system is configured to determine 506 content-adapting neural network layer based on the adapting features and/or the adapting kernel. In an embodiment, the content-adapting neural network utilizes one or more content-adapting layers that use pixel-adaptive convolution (PAC) in the manner described elsewhere in this disclosure, such as in connection with FIGS. 1-4. In an embodiment, the content-adaptive neural network layer includes one or more pixel-adaptive convolution operations. In an embodiment, a convolution operation is made content-dependent—rather than content-agnostic—based on pixel features. A pixel-adaptive convolution is, in an embodiment, calculated as:

$$v'_p = \frac{1}{C(f,v)} \sum_{q \in \mathcal{N}(p)} W(q-p) K(f_q, f_p) v_q + b$$

In an embodiment and according to the equation above, p and q refer to pixel positions; $v_*$ and $v'_*$ refer to input and output values, respectively; W refers to filter weights, K refers to a pixel-adaptive kernel; C refers to an optional normalization parameter; and $f_*$ refers to another input in addition to $v_*$. In an embodiment, the pixel-adaptive kernel is implemented as any suitable kernel function that can be backpropagated (e.g., learned through backpropagation).

Figure 6:
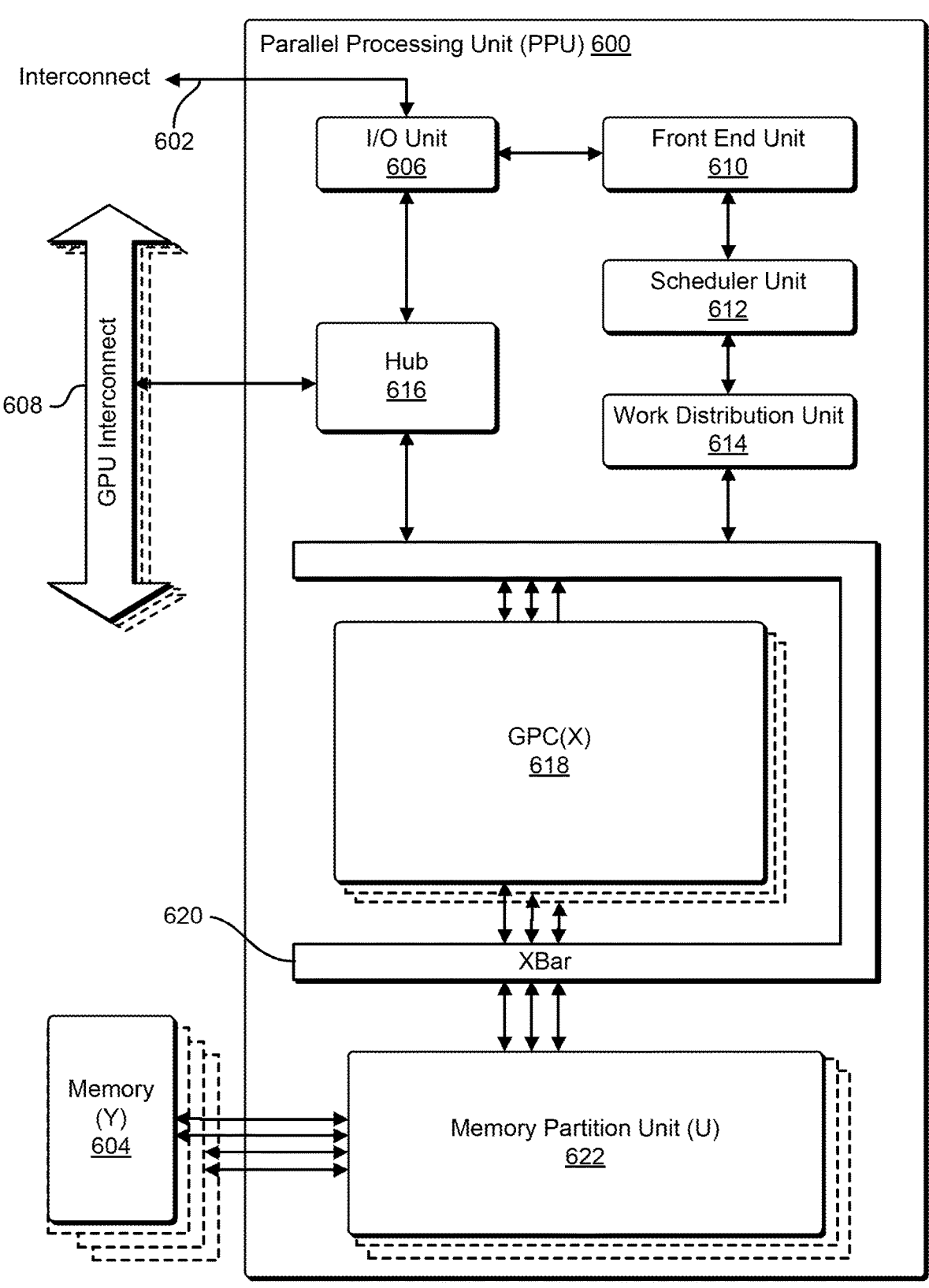
FIG. 6 illustrates an example of parallel processing unit ("PPU"), in accordance with an embodiment.

FIG. 6 illustrates a parallel processing unit ("PPU") 600, in accordance with one embodiment. In an embodiment, the PPU 600 is configured with machine-readable code that, if executed by the PPU, causes the PPU to perform some or all of processes and techniques described throughout this disclosure. In an embodiment, the PPU 600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 600. In an embodiment, the PPU 600 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 600 is utilized to perform computations such as linear algebra operations and machine-learning operations. FIG. 6 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 600 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 600 includes an Input/Output ("I/O") unit 605, a front-end unit 610, a scheduler unit 612, a work distribution unit 614, a hub 616, a crossbar ("Xbar") 620, one or more general processing clusters ("GPCs") 618, and one or more partition units 622. In an embodiment, the PPU 600 is connected to a host processor or other PPUs 600 via one or more high-speed GPU interconnects 608. In an embodiment, the PPU 600 is connected to a host processor or other peripheral devices via an interconnect 602. In an embodiment, the PPU 600 is connected to a local memory comprising one or more memory devices 604. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 608 may refer to a wire-based multi-lane communications link that is used by systems to scale and include one or more PPUs 600 combined with one or more CPUs, supports cache coherence between the PPUs 600 and CPUs, and CPU mastering. In an embodiment, data and/or commands are transmitted by the high-speed GPU interconnect 608 through the hub 616 to/from other units of the PPU 600 such as one or more copy engines, video encoders, video decoders, power management units, and other components which may not be explicitly illustrated in FIG. 6.

In an embodiment, the I/O unit 605 is configured to transmit and receive communications (e.g., commands, data) from a host processor (not illustrated in FIG. 6) over the system bus 602. In an embodiment, the I/O unit 605 communicates with the host processor directly via the system bus 602 or through one or more intermediate devices such as a memory bridge. In an embodiment, the I/O unit 605 may communicate with one or more other processors, such as one or more of the PPUs 600 via the system bus 602. In an embodiment, the I/O unit 605 implements a Peripheral Component Interconnect Express ("PCIe") interface for communications over a PCIe bus. In an embodiment, the I/O unit 605 implements interfaces for communicating with external devices.

In an embodiment, the I/O unit 605 decodes packets received via the system bus 602. In an embodiment, at least some packets represent commands configured to cause the PPU 600 to perform various operations. In an embodiment, the I/O unit 605 transmits the decoded commands to various other units of the PPU 600 as specified by the commands. In an embodiment, commands are transmitted to the front-end unit 610 and/or transmitted to the hub 616 or other units of the PPU 600 such as one or more copy engines, a video encoder, a video decoder, a power management unit, etc. (not explicitly illustrated in FIG. 6). In an embodiment, the I/O unit 605 is configured to route communications between and among the various logical units of the PPU 600.

In an embodiment, a program executed by the host processor encodes a command stream in a buffer that provides workloads to the PPU 600 for processing. In an embodiment, a workload comprises instructions and data to be processed by those instructions. In an embodiment, the buffer is a region in a memory that is accessible (e.g., read/write) by both the host processor and the PPU 600—the host interface unit may be configured to access the buffer in a system memory connected to the system bus 602 via memory requests transmitted over the system bus 602 by the I/O unit 605. In an embodiment, the host processor writes the command stream to the buffer and then transmits a pointer to the start of the command stream to the PPU 600 such that the front-end unit 610 receives pointers to one or more command streams and manages the one or more streams, reading commands from the streams and forwarding commands to the various units of the PPU 600.

In an embodiment, the front-end unit 610 is coupled to a scheduler unit 612 that configures the various GPCs 618 to process tasks defined by the one or more streams. In an embodiment, the scheduler unit 612 is configured to track state information related to the various tasks managed by the scheduler unit 612 where the state information may indicate which GPC 618 a task is assigned to, whether the task is active or inactive, a priority level associated with the task, and so forth. In an embodiment, the scheduler unit 612 manages the execution of a plurality of tasks on the one or more GPCs 618.

In an embodiment, the scheduler unit 612 is coupled to a work distribution unit 614 that is configured to dispatch tasks for execution on the GPCs 618. In an embodiment, the work distribution unit 614 tracks a number of scheduled tasks received from the scheduler unit 612 and the work distribution unit 614 manages a pending task pool and an active task pool for each of the GPCs 618. In an embodiment, the pending task pool comprises a number of slots (e.g., 32 slots) that contain tasks assigned to be processed by a particular GPC 618; the active task pool may comprise a number of slots (e.g., 4 slots) for tasks that are actively being processed by the GPCs 618 such that as a GPC 618 completes the execution of a task, that task is evicted from the active task pool for the GPC 618 and one of the other tasks from the pending task pool is selected and scheduled for execution on the GPC 618. In an embodiment, if an active task is idle on the GPC 618, such as while waiting for a data dependency to be resolved, then the active task is evicted from the GPC 618 and returned to the pending task pool while another task in the pending task pool is selected and scheduled for execution on the GPC 618.

In an embodiment, the work distribution unit 614 communicates with the one or more GPCs 618 via XBar 620. In an embodiment, the XBar 620 is an interconnect network that couples many of the units of the PPU 600 to other units of the PPU 600 and can be configured to couple the work distribution unit 614 to a particular GPC 618. Although not shown explicitly, one or more other units of the PPU 600 may also be connected to the XBar 620 via the hub 616.

The tasks are managed by the scheduler unit 612 and dispatched to a GPC 618 by the work distribution unit 614. The GPC 618 is configured to process the task and generate results. The results may be consumed by other tasks within the GPC 618, routed to a different GPC 618 via the XBar

620, or stored in the memory 604. The results can be written to the memory 604 via the partition units 622, which implement a memory interface for reading and writing data to/from the memory 604. The results can be transmitted to another PPU 604 or CPU via the high-speed GPU interconnect 608. In an embodiment, the PPU 600 includes a number U of partition units 622 that is equal to the number of separate and distinct memory devices 604 coupled to the PPU 600. A partition unit 622 will be described in more detail below in conjunction with FIG. 8.

In an embodiment, a host processor executes a driver kernel that implements an application programming interface ("API") that enables one or more applications executing on the host processor to schedule operations for execution on the PPU 600. In an embodiment, multiple compute applications are simultaneously executed by the PPU 600 and the PPU 600 provides isolation, quality of service ("QoS"), and independent address spaces for the multiple compute applications. In an embodiment, an application generates instructions (e.g., in the form of API calls) that cause the driver kernel to generate one or more tasks for execution by the PPU 600 and the driver kernel outputs tasks to one or more streams being processed by the PPU 600. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 8A.

Figure 7:
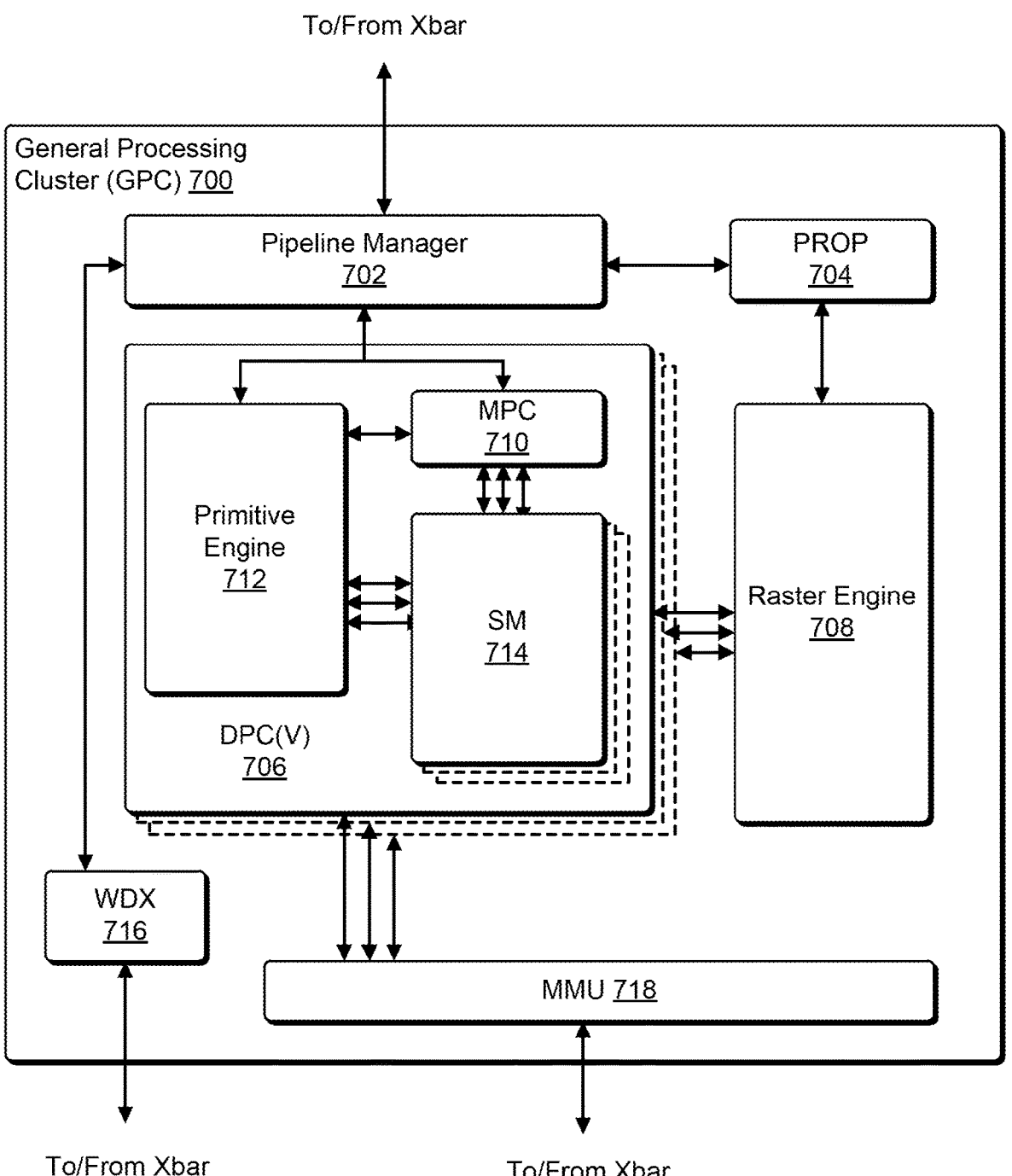
FIG. 7 illustrates an example of a general processing cluster ("GPC"), in accordance with one embodiment.

FIG. 7 illustrates a GPC 700 such as the GPC illustrated of the PPU 600 of FIG. 6, in accordance with one embodiment. In an embodiment, each GPC 700 includes a number of hardware units for processing tasks and each GPC 700 includes a pipeline manager 702, a pre-raster operations unit ("PROP") 704, a raster engine 708, a work distribution crossbar ("WDX") 716, a memory management unit ("MMU") 718, one or more Data Processing Clusters ("DPCs") 706, and any suitable combination of parts. It will be appreciated that the GPC 700 of FIG. 7 may include other hardware units in lieu of or in addition to the units shown in FIG. 7.

In an embodiment, the GPC 700 is a system comprising and/or having access to one or more processors and memory to store executable instructions that, as a result of execution, cause the one or more processors to train a convolutional neural network having two or more filter layers having different filtering parameters corresponding to respective different portions of a digital representation of the image. In an embodiment, the GPC 700 is a system, comprising one or more computers comprising one or more processors to train a convolutional neural network having two or more filter layers having different filtering parameters corresponding to respective different portions of a digital representation of the image. In an embodiment, the one or more processors include one or more streaming multiprocessor 714 as illustrated in FIG. 7. In an embodiment, the convolutional neural network is trained for a task including but not limited to joint upsampling of images. In an embodiment, the convolutional neural network is train for joint upsampling and the convolutional neural network comprises a guidance branch operating on the digital representation of the image for generating adapting features to be used for the two or more filter layers; an encoder branch operating on a second digital representation of a second image using one or more convo lution layers different from the two or more filter layers; and a decoder branch for generating an upsampled output using at least the encoder branch and guidance branch. In an embodiment, the guidance branch uses a high-resolution guidance signal (e.g., high-resolution image) and the encoder branch operates on a low-resolution signal (e.g., low-resolution image to be upsampled). In an embodiment, the two or more filter layers lack a parameterization as a higher-dimensional filter than the two or more spatially invariant filter layers. In an embodiment, the adapting features used for the adapting kernel are learned. In an embodiment, the different filtering parameters are determined based at least in part on pixel colors of a portion of the digital representation of the image being filtered.

In an embodiment, the operation of the GPC 700 is controlled by the pipeline manager 702. The pipeline manager 702 manages the configuration of the one or more DPCs 706 for processing tasks allocated to the GPC 700. In an embodiment, the pipeline manager 702 configures at least one of the one or more DPCs 706 to implement at least a portion of a graphics rendering pipeline. In an embodiment, a DPC 706 is configured to execute a vertex shader program on the programmable streaming multiprocessor ("SM") 714. The pipeline manager 702 is configured to route packets received from a work distribution to the appropriate logical units within the GPC 700, in an embodiment, and some packets may be routed to fixed function hardware units in the PROP 704 and/or raster engine 708 while other packets may be routed to the DPCs 706 for processing by the primitive engine 712 or the SM 714. In an embodiment, the pipeline manager 702 configures at least one of the one or more DPCs 706 to implement a neural network model and/or a computing pipeline.

The PROP unit 704 is configured, in an embodiment, to route data generated by the raster engine 708 and the DPCs 706 to a Raster Operations ("ROP") unit in the memory partition unit, described in more detail above. In an embodiment, the PROP unit 704 is configured to perform optimizations for color blending, organize pixel data, perform address translations, and more. The raster engine 708 includes a number of fixed function hardware units configured to perform various raster operations, in an embodiment, and the raster engine 708 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 708 comprises fragments to be processed by any suitable entity such as by a fragment shader implemented within a DPC 706.

In an embodiment, each DPC 706 included in the GPC 700 comprises an M-Pipe Controller ("MPC") 710; a primitive engine 712; one or more SMs 714; and any suitable combination thereof. In an embodiment, the MPC 710 controls the operation of the DPC 706, routing packets received from the pipeline manager 702 to the appropriate units in the DPC 706. In an embodiment, packets associated with a vertex are routed to the primitive engine 712, which is configured to fetch vertex attributes associated with the vertex from memory; in contrast, packets associated with a shader program may be transmitted to the SM 714.

In an embodiment, the SM 714 comprises a programmable streaming processor that is configured to process tasks represented by a number of threads. In an embodiment, the SM 714 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 714 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 714 is described in more detail below.

In an embodiment, the MMU 718 provides an interface between the GPC 700 and the memory partition unit and the MMU 718 provides translation of virtual addresses into physical addresses, memory protection, and arbitration of memory requests. In an embodiment, the MMU 718 provides one or more translation lookaside buffers ("TLBs") for performing translation of virtual addresses into physical addresses in memory.

Figure 8:
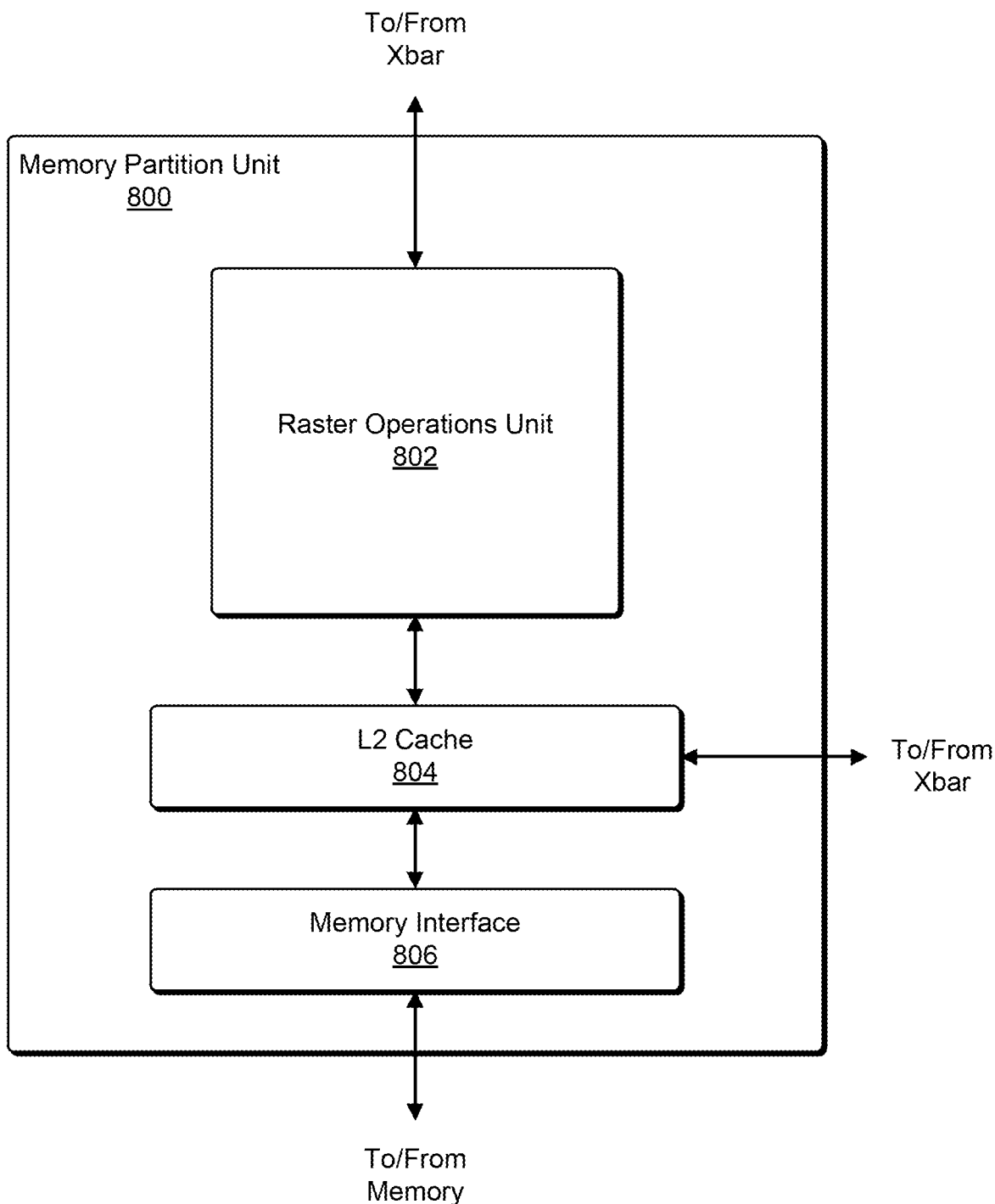
FIG. 8 illustrates an example of a memory partition unit, in accordance with one embodiment.

FIG. 8 illustrates a memory partition unit of a PPU, in accordance with one embodiment. In an embodiment, the memory partition unit 800 includes a Raster Operations ("ROP") unit 802; a level two ("L2") cache 804; a memory interface 806; and any suitable combination thereof. The memory interface 806 is coupled to the memory. Memory interface 806 may implement 32, 64, 128, 1024-bit data buses, or the like, for high-speed data transfer. In an embodiment, the PPU incorporates U memory interfaces 806, one memory interface 806 per pair of partition units 800, where each pair of partition units 800 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory partition unit 800 includes or has access to memory to load instructions, which if performed by one or more processors, cause the one or more processors to at least train a convolutional neural network having two or more filter layers having different filtering parameters corresponding to respective different portions of a digital representation of the image. In an embodiment, the instructions are not necessarily simultaneously loaded into memory for execution. In an embodiment, portions of executable instructions are loaded into short-term memory units such as registers, cache, and dynamic random access memory and unloaded and/or replaced by other portions of the executable code as upon execution. In an embodiment, the memory partition unit 800 includes or controls access to memory (e.g., SDRAM) and one or more processors (e.g., streaming multiprocessors) for training neural networks including but not limited to in the manner described in connection with FIG. 5.

In an embodiment, the memory interface 806 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 800 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 608 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 800 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 6 or other system memory is fetched by the memory partition unit 800 and stored in the L2 cache 804, which is located on-chip and is shared between the various GPCs, in accordance with one embodiment. Each memory partition unit 800, in an embodiment, includes at least a portion of the L2 cache 760 associated with a corresponding memory device. In an embodiment, lower level caches are implemented in various units within the GPCs. In an embodiment, each of the SMs 840 may implement a level one ("L1") cache wherein the L1 cache is private memory that is dedicated to a particular SM 840 and data from the L2 cache 804 is fetched and stored in each of the L1 caches for processing in the functional units of the SMs 840. In an embodiment, the L2 cache 804 is coupled to the memory interface 806 and the XBar 620.

The ROP unit 802 performs graphics raster operations related to pixel color, such as color compression, pixel blending, and more, in an embodiment. The ROP unit $$50, in an embodiment, implements depth testing in conjunction with the raster engine 825, receiving a depth for a sample location associated with a pixel fragment from the culling engine of the raster engine 825. In an embodiment, the depth is tested against a corresponding depth in a depth buffer for a sample location associated with the fragment. In an embodiment, if the fragment passes the depth test for the sample location, then the ROP unit 802 updates the depth buffer and transmits a result of the depth test to the raster engine 825. It will be appreciated that the number of partition units 800 may be different than the number of GPCs and, therefore, each ROP unit 802 can, in an embodiment, be coupled to each of the GPCs. In an embodiment, the ROP unit 802 tracks packets received from the different GPCs and determines which that a result generated by the ROP unit 802 is routed to through the Xbar.

Figure 9:
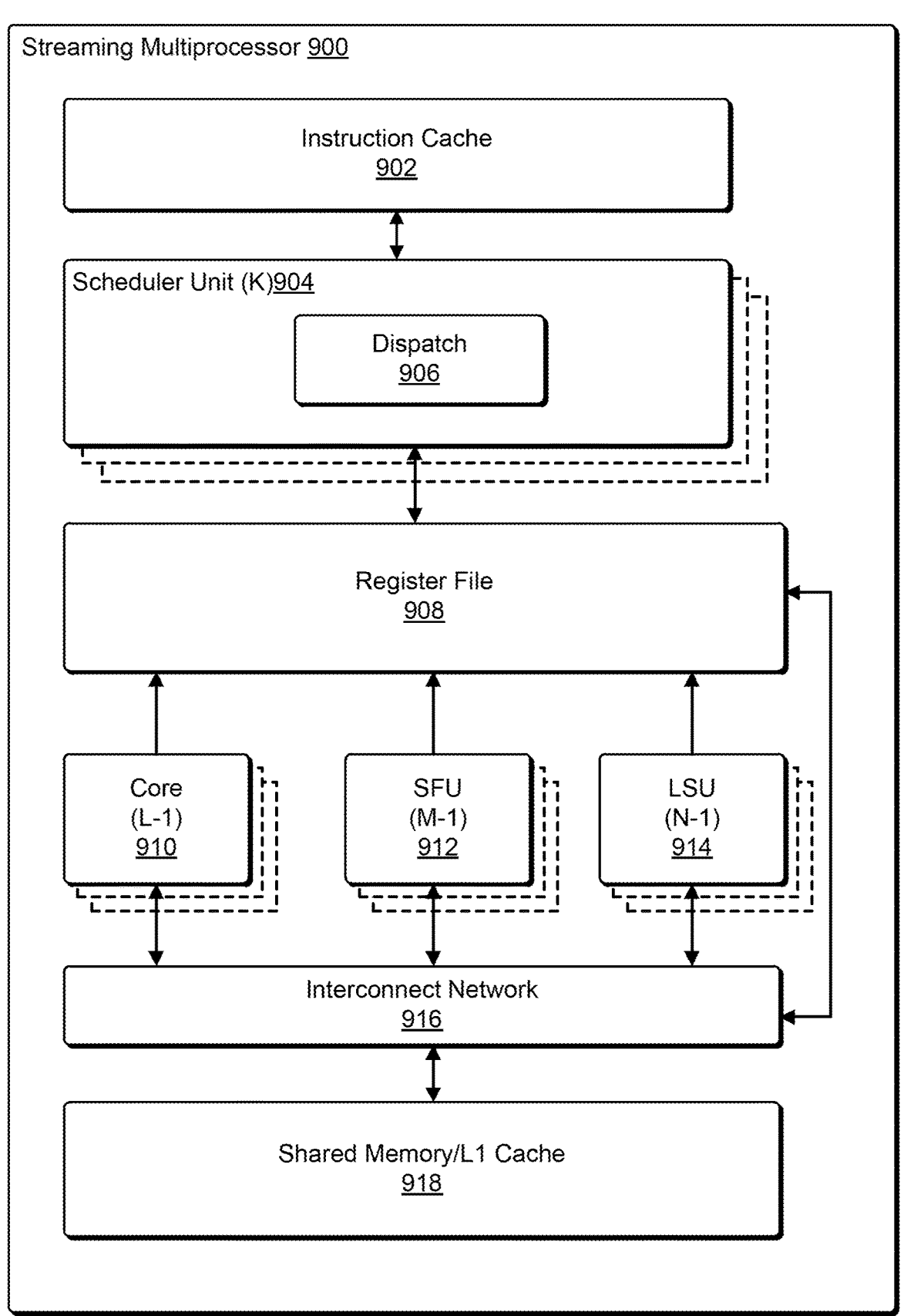
FIG. 9 illustrates an example of a streaming multiprocessor, in accordance with one embodiment.

FIG. 9 illustrates a streaming multi-processor such as the streaming multi-processor of FIG. 7, in accordance with one embodiment. In an embodiment, the SM 900 includes: an instruction cache 902; one or more scheduler units 904; a register file 908; one or more processing cores 910; one or more special function units ("SFUs") 912; one or more load/store units ("LSUs") 914; an interconnect network 916; a shared memory/L1 cache 918; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 900. In an embodiment, the scheduler unit 904 receives the tasks from the work distribution unit and manages instruction scheduling for one or more thread blocks assigned to the SM 900. In an embodiment, the scheduler unit 904 schedules thread blocks for execution as warps of parallel threads, wherein each thread block is allocated at least one warp. In an embodiment, each warp executes threads. In an embodiment, the scheduler unit 904 manages a plurality of different thread blocks, allocating the warps to the different thread blocks and then dispatching instructions from the plurality of different cooperative groups to the various functional units (e.g., cores 910, SFUs 912, and LSUs 914) during each clock cycle.

In an embodiment, the streaming multiprocessor 900 is a processor comprising one or more arithmetic logic units (ALUs) to be configured to identify one or more features within an image based, at least in part, on a convolutional neural network having two or more filter layers having different filtering parameters corresponding to respective different portions of a digital representation of the image. In an embodiment, the different filtering parameters are determined based at least in part on pixel coordinates or other representations of the location of pixels of a portion of the image being filtered. In an embodiment, the different filtering parameters are if a fixed parametric form, including but not limited to a Gaussian:

$$K(f_i - f_j) = \exp\left(-\frac{1}{2}(f_i - f_j)^T(f_i - f_j)\right).$$

In an embodiment, the two or more filter layers are hidden layers of a convolutional neural network. In an embodiment, the PPU 600 includes the one or more arithmetic logic units to be configured to identify the one or more features within the image and the PPU 600 is or comprises a graphics processing units. In an embodiment, a pixel-adaptive convolution is implemented as a network layer with GPU acceleration. In an embodiment, the processor to identify the one or more features is any suitable processor including but not limited to graphics processing units and central processing units.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 906 is configured to transmit instructions to one or more of the functional units and the scheduler unit 904 includes two dispatch units 906 that enable two different instructions from the same warp to be dispatched during each clock cycle. In an embodiment, each scheduler unit 904 includes a single dispatch unit 906 or additional dispatch units 906.

Each SM 900, in an embodiment, includes a register file 908 that provides a set of registers for the functional units of the SM 900. In an embodiment, the register file 908 is divided between each of the functional units such that each functional unit is allocated a dedicated portion of the register file 908. In an embodiment, the register file 908 is divided between the different warps being executed by the SM 900 and the register file 908 provides temporary storage for operands connected to the data paths of the functional units. In an embodiment, each SM 900 comprises a plurality of L processing cores 910. In an embodiment, the SM 900 includes a large number (e.g., 128 or more) of distinct processing cores 910. Each core 910, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 910 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 910. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 900 comprises M SFUs 912 that perform special functions (e.g., attribute evaluation, reciprocal square root, and the like). In an embodiment, the SFUs 912 include a tree traversal unit configured to traverse a hierarchical tree data structure. In an embodiment, the SFUs 912 include texture unit configured to perform texture map filtering operations. In an embodiment, the texture units are configured to load texture maps (e.g., a 2D array of texels) from the memory and sample the texture maps to produce sampled texture values for use in shader programs executed by the SM 900. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 900 includes two texture units.

Each SM 900 comprises N LSUs 854 that implement load and store operations between the shared memory/L1 cache 806 and the register file 908, in an embodiment. Each SM 900 includes an interconnect network 916 that connects each of the functional units to the register file 908 and the LSU 914 to the register file 908, shared memory/L1 cache 918 in an embodiment. In an embodiment, the interconnect network 916 is a crossbar that can be configured to connect any of the functional units to any of the registers in the register file 908 and connect the LSUs 914 to the register file and memory locations in shared memory/L1 cache 918.

The shared memory/L1 cache 918 is an array of on-chip memory that allows for data storage and communication between the SM 900 and the primitive engine and between threads in the SM 900 in an embodiment. In an embodiment, the shared memory/L1 cache 918 comprises 128 KB of storage capacity and is in the path from the SM 900 to the partition unit. The shared memory/L1 cache 918, in an embodiment, is used to cache reads and writes. One or more of the shared memory/L1 cache 918, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache

918 enables the shared memory/L1 cache 918 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 900 to execute the program and perform calculations, shared memory/L1 cache 918 to communicate between threads, and the LSU 914 to read and write global memory through the shared memory/L1 cache 918 and the memory partition unit, in accordance with one embodiment. In an embodiment, when configured for general purpose parallel computation, the SM 900 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 10:
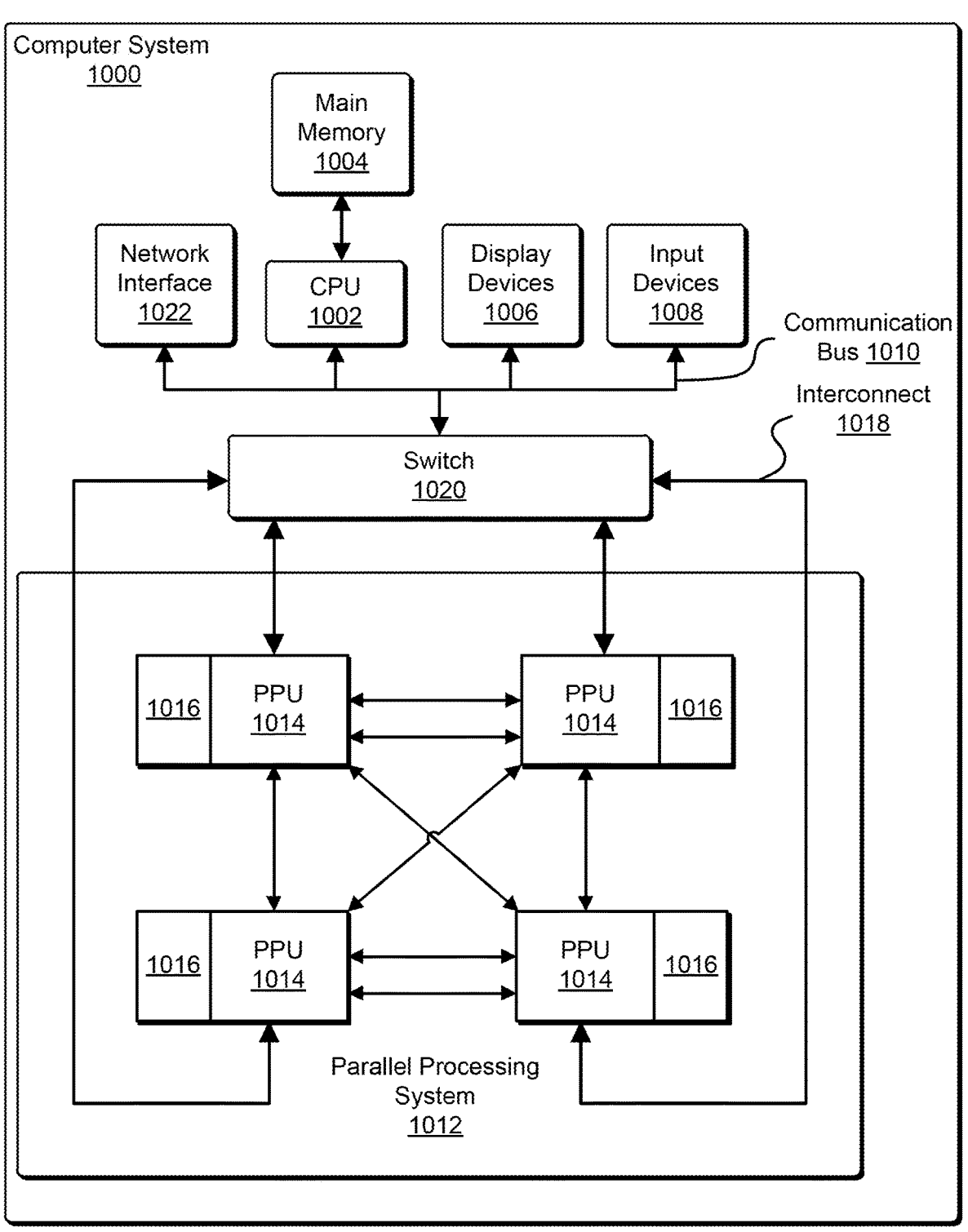
FIG. 10 illustrates a computer system in which the various examples can be implemented, in accordance with one embodiment.

FIG. 10 illustrates a computer system 1000 in which the various architecture and/or functionality can be implemented, in accordance with one embodiment. The computer system 1000, in an embodiment, is configured to implement various processes and methods described throughout this disclosure.

In an embodiment, the computer system 1000 comprises at least one central processing unit 1002 that is connected to a communication bus 1010 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1000 includes a main memory 1004 and control logic (e.g., implemented as hardware, software, or a combination thereof) and data are stored in the main memory 1004 which may take the form of random access memory ("RAM"). In an embodiment, a network interface subsystem 1022 provides an interface to other computing devices and networks for receiving data from and transmitting data to other systems from the computer system 1000.

The computer system 1000, in an embodiment, includes input devices 1008, the parallel processing system 1012, and display devices 1006 which can be implemented using a conventional CRT (cathode ray tube), LCD (liquid crystal display), LED (light emitting diode), plasma display, or other suitable display technologies. In an embodiment, user input is received from input devices 1008 such as keyboard, mouse, touchpad, microphone, and more. In an embodiment, each of the foregoing modules can be situated on a single semiconductor platform to form a processing system.

In an embodiment, a machine-readable medium comprises a set of instructions, which if performed by one or more processors of the computer system 1000, cause the one or more processors to at least train a convolutional neural network having two or more filter layers having different filtering parameters corresponding to respective different portions of a digital representation of the image. In an embodiment, the instructions are executed by one or more processors to train the convolutional neural network. In an embodiment, the convolutional neural network is for assigning sematic labels to the different portions of the digital representation of the image. In an embodiment, the two or more filter layer replace two or more spatially invariant filter layers. In an embodiment, the two or more filter layers are spatially variant filter layers. In an embodiment, the convolutional neural network comprises one or more convolutional layers in addition to the two or more filter layers having the different filtering parameters. In an embodiment, the one or more processors include a central processing unit (CPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1004 and/or secondary storage. Computer programs, if executed by one or more processors, enable the system 1000 to perform various functions in accordance with one embodiment. The memory 1004, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1002; parallel processing system 1012; an integrated circuit capable of at least a portion of the capabilities of both the central processor 1002; the parallel processing system 1012; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more.

In an embodiment, the computer system 1000 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1012 includes a plurality of PPUs 1014 and associated memories 1016. In an embodiment, the PPUs are connected to a host processor or other peripheral devices via an interconnect 1018 and a switch 1020 or multiplexer. In an embodiment, the parallel processing system 1012 distributes computational tasks across the PPUs 1014 which can be parallelizable—for example, as part of the distribution of computational tasks across multiple GPU thread blocks. In an embodiment, memory is shared and accessible (e.g., for read and/or write access) across some or all of the PPUs 1014, although such shared memory may incur performance penalties relative to the use of local memory and registers resident to a PPU. In an embodiment, the operation of the PPUs 1014 is synchronized through the use of a command such as syncthreads ( ) which requires all threads in a block (e.g., executed across multiple PPUs 1014) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system"

and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more computers comprising one or more processors to modify one or more filters of one or more neural networks based, at least in part, on one or more colors of one or more pixels, to which the one or more filters are to be applied, wherein the one or more neural networks comprise:
a guidance branch operating on a first representation of one or more input images for generating adapting features to be used to modify one or more filter layers;
an encoder branch operating on a second representation of a second one or more input images using one or more convolution layers different from the one or more filter layers; and
a decoder branch for generating an upsampled output using at least the encoder branch and guidance branch.

2. The system of claim 1, wherein the first representation of the one or more input images operated upon by the guidance branch is a high-resolution guidance and the second representation of the second one or more input images is a low-resolution signal.

3. The system of claim 2, wherein the low-resolution signal is obtained from ground truth data using nearest neighbor downsampling.

4. The system of claim 1, wherein the one or more processors are further to modify the one or more filters based, at least in part, on one or more regions of one or more input images to generate one or more output images.

5. The system of claim 1, wherein the one or more processors are further to modify a spatially invariant filter to generate the one or more modified filters that comprise different filtering parameters determined based at least in part on pixel colors of one or more regions of one or more input images being filtered.

6. A non-transitory machine-readable medium having stored thereon a set of instructions, which if performed by one or more processors, cause the one or more processors to at least:
modify one or more filters of one or more neural networks based, at least in part, on one or more colors of one or more pixels, to which the one or more filters are to be applied, wherein the one or more neural networks comprise:
a guidance branch operating on a first representation of one or more input images for generating adapting features to be used to modify one or more filter layers;
an encoder branch operating on a second representation of a second one or more input images using one or more convolution layers different from the one or more filter layers; and
a decoder branch for generating an upsampled output using at least the encoder branch and guidance branch.

7. The non-transitory machine-readable medium of claim 6, wherein the set of instructions further include instructions, which if performed by the one or more processors to use the one or more neural networks to assign sematic labels to one or more portions of an output image.

8. The non-transitory machine-readable medium of claim 6, wherein the set of instructions further include instructions, which if performed by the one or more processors to modify the one or more filters based, at least in part, on one or more regions of one or more input images to generate one or more output images.

9. The non-transitory machine-readable medium of claim 8, wherein the one or more modified filters comprise layers are spatially variant filter layers.

10. The non-transitory machine-readable medium of claim 6, wherein the one or more neural networks comprise one or more convolutional layers in addition to one or more filter layers having different filtering parameters.

11. The non-transitory machine-readable medium of claim 6, wherein the one or more neural networks is trained for semantic segmentation.

12. A processor, comprising:
one or more circuits to modify one or more filters of one or more neural networks based, at least in part, on one or more colors of one or more pixels, to which the one or more filters are to be applied, wherein the one or more neural networks comprise:
a guidance branch operating on a first representation of one or more input images for generating adapting features to be used to modify one or more filter layers;
an encoder branch operating on a second representation of a second one or more input images using one or more convolution layers different from the one or more filter layers; and
a decoder branch for generating an upsampled output using at least the encoder branch and guidance branch.

13. The processor of claim 12, wherein the one or more circuits are further to replace one or more spatially invariant filter layers of the one or more neural networks with two or more filter layers, wherein different filtering parameters of the two or more filter layers are determined based at least in part on coordinates of a portion of a digital representation of one or more input images being filtered.

14. The processor of claim 13, wherein pre-trained weights associated with the one or more spatially invariant filter layers are retained by the two or more filter layers.

15. The processor of claim 13, wherein the two or more filter layers have a same dimensionality as the one or more spatially invariant filter layers.

16. The processor of claim 13, wherein the one or more neural networks comprise a fully convolutional network (FCN).

17. The processor of claim 12, wherein the one or more circuits are to generate one or more output images based at least in part on the one or more modified filters, wherein the one or more modified filters vary based at least in part on multiplying a spatially invariant filter to generate the one or more modified filters, wherein the multiplication is based on different portions of a digital representation of one or more input images.

18. The processor of claim 12, wherein one or more filter layers are part of convolutional layers of the one or more neural networks where the convolutional layers of the one or more neural networks output one or more output images.

19. The processor of claim 12, wherein the one or more circuits are further to adjust a convolution operation by modifying a filter with standard convolutions, wherein the modification to be applied to the filter with standard convolutions is based, at least in part, on pixel color variations in one or more regions of one or more input images.

\* \* \* \* \*